(12) United States Patent
Maienschein et al.

(10) Patent No.: US 7,775,335 B2
(45) Date of Patent: *Aug. 17, 2010

(54) TORQUE TRANSMITTING DEVICE

(75) Inventors: Stephan Maienschein, Baden-Baden (DE); Marc Meisner, Buehl-Waitenung (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 396 days.

This patent is subject to a terminal disclaimer.

(21) Appl. No.: 11/638,915

(22) Filed: Dec. 14, 2006

(65) Prior Publication Data

US 2007/0137963 A1 Jun. 21, 2007

(30) Foreign Application Priority Data

Dec. 17, 2005 (DE) ........................ 10 2005 060 566

(51) Int. Cl.
*F16H 45/02* (2006.01)
(52) U.S. Cl. ..................... 192/3.29; 192/55.61; 192/212
(58) Field of Classification Search ................ 192/3.29, 192/55.61, 212–214.1, 109 R; 464/68.1–68.92
See application file for complete search history.

(56) References Cited

U.S. PATENT DOCUMENTS

| | | | | |
|---|---|---|---|---|
| 4,027,757 A | * | 6/1977 | Radke et al. ............... | 464/64.1 |
| 4,613,029 A | * | 9/1986 | Beccaris ..................... | 192/210 |
| 5,771,998 A | * | 6/1998 | Olsen et al. ................ | 192/3.29 |
| 5,975,261 A | * | 11/1999 | Woerner et al. ............ | 192/3.29 |
| 6,142,272 A | * | 11/2000 | Meisner et al. ............ | 192/3.29 |
| 6,223,872 B1 | * | 5/2001 | Heller et al. ............... | 192/3.29 |
| 2001/0015308 A1 | * | 8/2001 | Heller et al. ............... | 192/3.29 |
| 2008/0202880 A1 | * | 8/2008 | Kombowski ............... | 192/3.23 |

FOREIGN PATENT DOCUMENTS

DE 199 20 542 11/1999
FR 2 867 540 9/2005

* cited by examiner

*Primary Examiner*—Rodney H Bonck
*Assistant Examiner*—Justin Holmes
(74) *Attorney, Agent, or Firm*—Simpson & Simpson, PLLC

(57) ABSTRACT

The invention relates to a torque transmitting device having a hub arranged in the drive train of a motor vehicle for transmitting torque between a drive unit and a transmission, in particular a turbine wheel hub of a turbine wheel of a torque converter which is coupled to a damper hub with a rotational vibration damper connected in between via a driving plate, in particular of a converter bridge coupling. The invention is operatively arranged such that the rotational vibration damper is equipped with a mechanical stop mechanism that is in effect as soon as a maximum design load on the rotational vibration damper has been exceeded.

11 Claims, 3 Drawing Sheets

TORQUE TRANSMITTING DEVICE

CROSS REFERENCE TO RELATED APPLICATIONS

This patent application claims priority of German Patent Application No. 10 2005 060 566.4, filed Dec. 17, 2005, which application is incorporated herein by reference.

BACKGROUND OF THE INVENTION

The invention relates to a torque transmitting device having a hub, in particular a turbine wheel hub of a turbine wheel of a torque converter, arranged in the drive train of a motor vehicle for transmitting torque between a drive unit and a transmission, the torque converter being connected to a damper hub with a torsional vibration damper connected in between via a driving plate, in particular a converter bridge coupling.

SUMMARY OF THE INVENTION

The invention broadly comprises a torque transmitting device having a hub, in particular a turbine wheel hub of a turbine wheel of a torque converter, arranged in the drive train of a motor vehicle for transmitting torque between a drive unit and a transmission, the torque converter being coupled to a damper hub with a torsional vibration damper connected in between via a driving plate of a converter bridge coupling in particular due to the fact that the torsional vibration damper is equipped with a mechanical stop mechanism that is effective as soon as a maximum design load on the torsional vibration damper is exceeded. This yields the advantage that it effectively prevents an overload of the torsional vibration damper. An overload can be defined as any load in excess of the design damper capacity. The protection of the mechanical stop mechanism relates to the force transmitting components of the damper, including the elastic elements that are in effect in the damper.

A preferred exemplary embodiment comprises a torque transmitting device having a stop mechanism comprising stop fingers that start from the driving plate and protrude into an interspace bordered in the circumferential direction by two stop limiting elements provided on the damper hub. The maximum angle of rotation between the driving plate and the damper hub can be adjusted based on the distances in the circumferential direction between the stop fingers and the respective stop limiting elements.

In another preferred exemplary embodiment of the torque transmitting device, the stop fingers extend radially inward from a central opening in the driving plate. This allows space to be saved in the axial direction.

In another preferred exemplary embodiment of the torque transmitting device, the stop limiting elements extend axially from the damper hub. The stop limiting elements are preferably in the form of arcs of a circle.

In another preferred exemplary embodiment of the torque transmitting device, several stop fingers are distributed uniformly over the circumference of the driving plate. Preferably at least four stop fingers are uniformly distributed over the circumference of the driving plate.

In another preferred exemplary embodiment of the torque transmitting device, the stop fingers are arranged in the circumferential direction with one stop finger each between two coupling elements leading away from the hub. The coupling elements serve to connect the driving plate to the hub in a rotationally fixed manner. This achieves the result that any overload is directed from the hub directly into the damper hub via the stop fingers of the driving plate.

In another preferred exemplary embodiment of the torque transmitting device, the coupling elements extend axially away from the hub. The coupling elements are preferably in the form of arcs of a circle.

In another preferred exemplary embodiment of the torque transmitting device, one coupling finger extends radially inward from the driving plate between two stop fingers. The coupling fingers allow a good force distribution.

In another preferred exemplary embodiment of the torque transmitting device, the coupling fingers are arranged in the circumferential direction with one each between two coupling elements extending away from the hub. The coupling fingers are shorter than the stop fingers and do not extend into the inner spaces which are limited by two stop limiting elements provided on the damper hub in the circumferential direction.

In another preferred exemplary embodiment of the torque transmitting device, a damper hub flange is mounted on the damper hub. The two-part design with the damper hub and damper hub flange makes it possible for the two parts to adjust the maximum angle of rotation of the damper when establishing the connection of the damper hub flange to the damper hub. Thus, unlike previous approaches known in the past, it is possible to produce different damper characteristics, e.g., the torque via the angle of rotation, simply by varying the spring elements and without any further geometric change in the damper components.

In another preferred exemplary embodiment of the torque transmitting device, the damper hub flange is integrally bonded to the damper hub. The damper hub flange is preferably connected to the damper hub by a welded connection, in particular a laser-welded connection. The welded connection is preferably established only after adjusting the maximum angle of rotation of the damper.

The object of the invention is to create a torque transmitting device as recited in the claims that will have a longer lifetime than traditional torque transmitting devices.

BRIEF DESCRIPTION OF THE DRAWINGS

Additional advantages, features and details are derived from the following description in which an exemplary embodiment is described in detail with reference to the drawings, where.

DETAILED DESCRIPTION OF THE INVENTION

Figure 1:
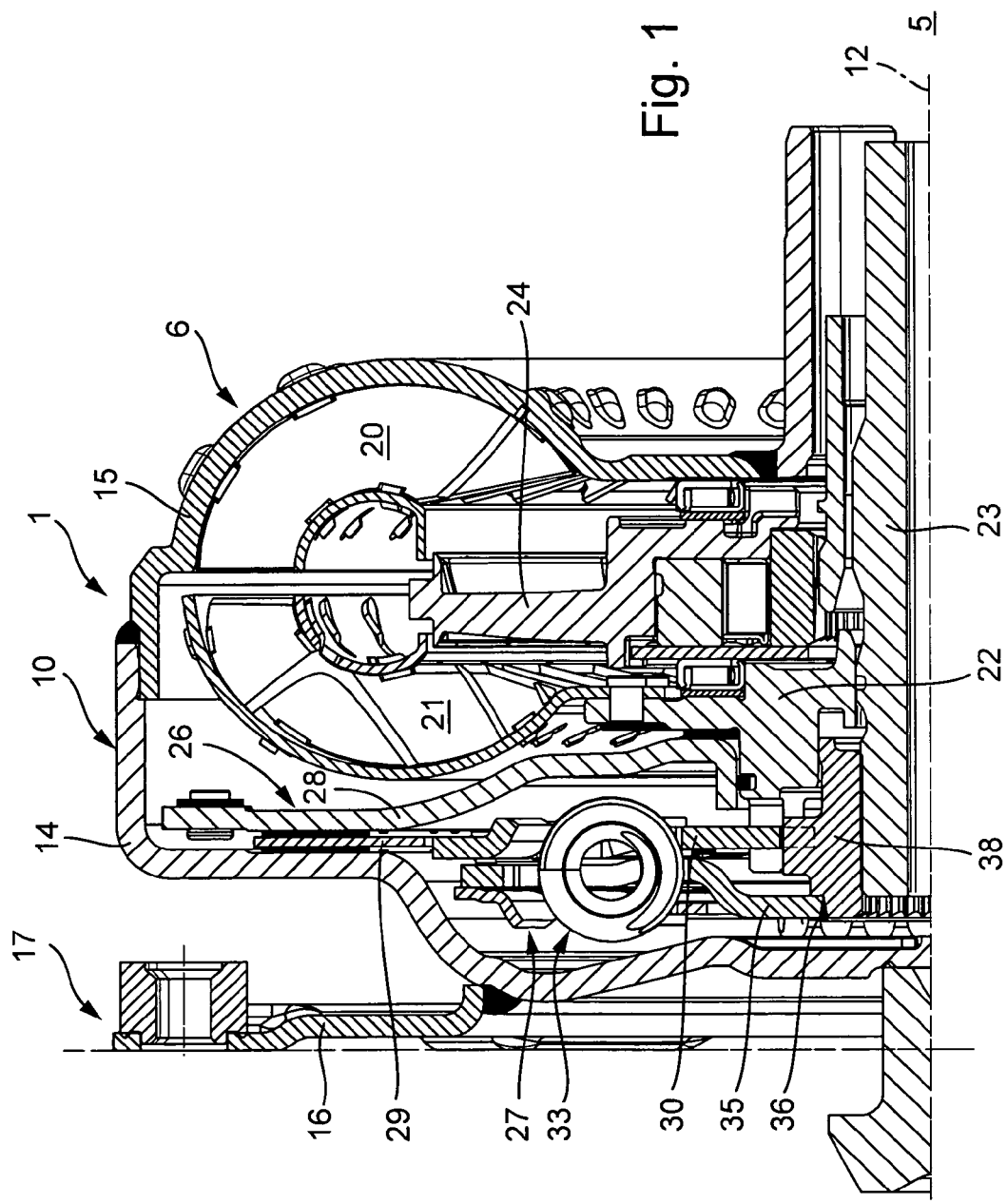
FIG. 1 shows a torque transmitting device according to a first exemplary embodiment in a half-sectional view.

FIG. 1 shows a part of drive train 1 of a motor vehicle. Hydrodynamic torque converter 6 is arranged between transmission 5 and drive unit 3, in particular an internal combustion engine, with a crankshaft extending out of it. The crankshaft of internal combustion engine 3 is connected to housing 10 of torque converter 6 in a rotationally fixed manner via a drive plate, which is also referred to as a flex plate.

Housing 10 of torque converter 6 is rotatable about axis of rotation 12 and is equipped with housing wall 14 near the drive and housing wall 15 at a distance from the drive. Starter gear rim 17 is mounted on housing wall 14 near the drive with the help of connecting sheet metal part 16 extending radially outward. Housing wall 15 at a distance from the drive is combined into a modular unit with pump wheel 20 of hydrodynamic torque converter 6.

Turbine wheel 21 which is mounted on turbine wheel hub 22 with the help of rivet connecting elements is arranged between pump wheel 20 and housing wall 14 near the drive.

Turbine wheel hub 22 is mounted to rotate in relation to input shaft 23 of transmission 5. Stator 24 is arranged between turbine wheel 21 and pump wheel 20 in a known way. Converter bridge coupling 26 with rotational vibration damper 27 is arranged between turbine wheel 21 and housing wall 14 near the drive, again in a known way. Converter bridge coupling 26 comprises piston 28 mounted to be rotatable and axially displaceable radially to the outside on turbine wheel hub 22. Piston 28 has on the outside, radially disposed, a friction surface facing internal combustion engine 3 and arranged opposite another friction surface which is provided on the side of housing wall 14 near the drive and facing away from internal combustion engine 3. Friction plate 29 connected to driving plate 30 in a rotationally fixed mount is arranged between the two friction surfaces.

Driving plate 30 is connected to damper flange 35 of rotational vibration damper 27 with energy storage elements 33 connected in between, in particular bow springs. Damper flange 35 is integrally bonded to damper hub 38 with the help of welded connection 36. Damper hub 38 is in turn connected to one end of input shaft 23 of transmission 5 in a rotationally fixed manner on the inside radially.

Figure 2:
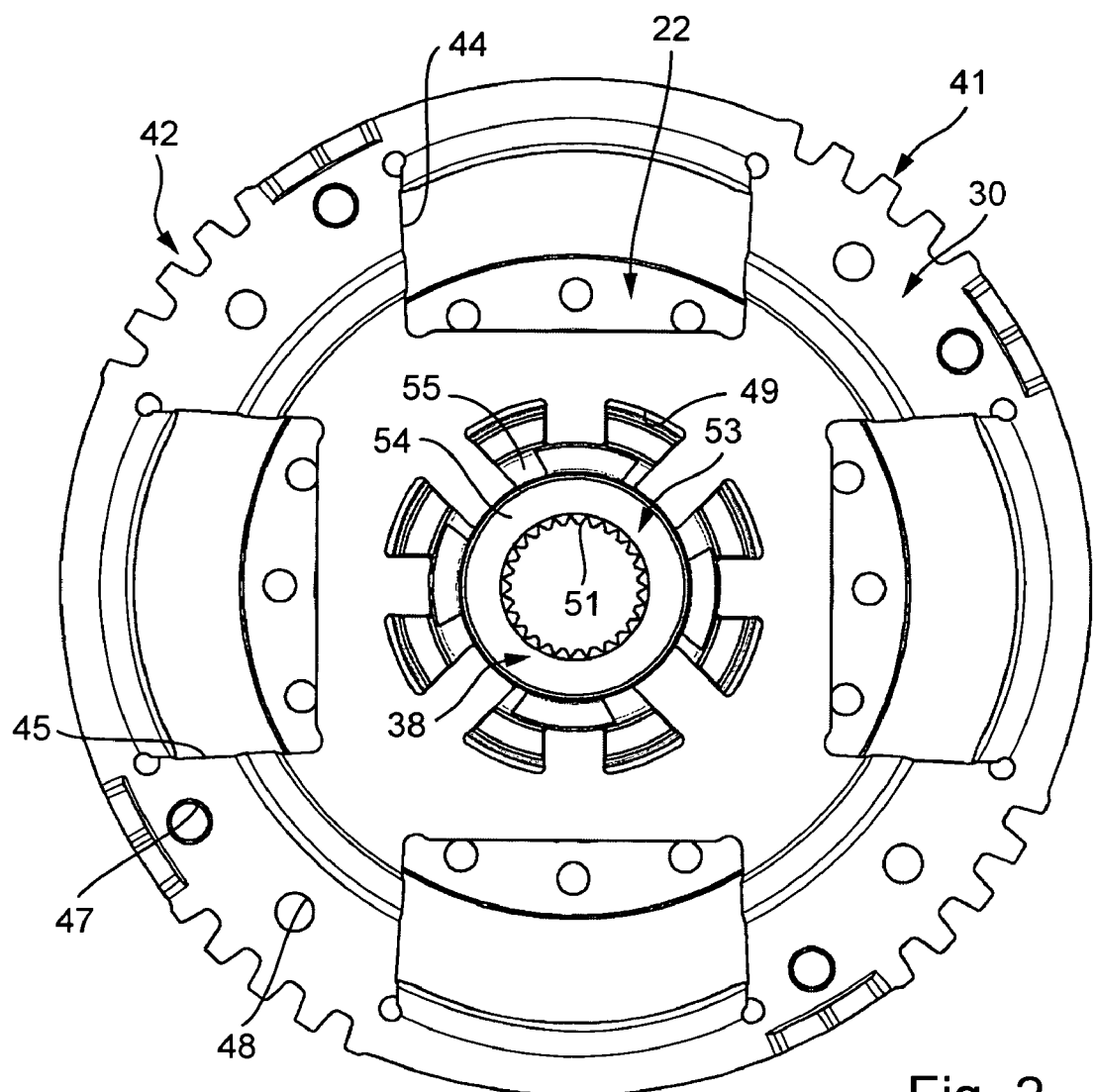
FIG. 2 shows a driving plate with a damper hub and a turbine wheel hub of the torque transmitting device from FIG. 1 as seen from above; and, FIG. 3 shows an enlarged detail from FIG. 2.

FIG. 2 shows turbine wheel hubs 22, driving plate 30 and damper hub 38, omitting the other parts in a view of drive unit 3 as seen from above, shown here in the assembled state. Driving plate 30 has essentially the shape of a circular ring plate. On the outside, disposed radially, driving plate 30 has several gear tooth areas 41, 42. Gear tooth areas 20 41, 42 serve to connect driving plate 30 to the friction plate (29 in FIG. 1) in a rotationally fixed but axially displaceable manner. In addition, driving plate 30 has four windows 44, 45 that are distributed uniformly over the circumference and serve to hold the energy storage elements (33 in FIG. 1) in a known manner. In addition, the driving plate has multiple through-holes 47, 48 which serve to allow the passage or rivet-connecting elements, for example. On the inside, 25 disposed radially, driving plate 30 has central through-hole 49 which is also referred to as an opening.

Damper hub 38 is arranged concentrically with driving plate 30 and partially in central through-hole 49. On the inside, disposed radially, damper hub 38 is equipped with internal gear teeth 51. Internal gear teeth 51 are designed on the inside on essentially tubular damper hub body 53, of which only ring surface 54 is visible in FIG. 2. Outside ring surface 54 radially and concentrically with it, damper hub 38 has another ring surface 55. However, additional ring surface 55 is arranged with an offset in the axial direction to ring surface 54. In the view shown here, additional ring surface 55 is offset into the plane of the paper with respect to ring surface 54.

Figure 3:
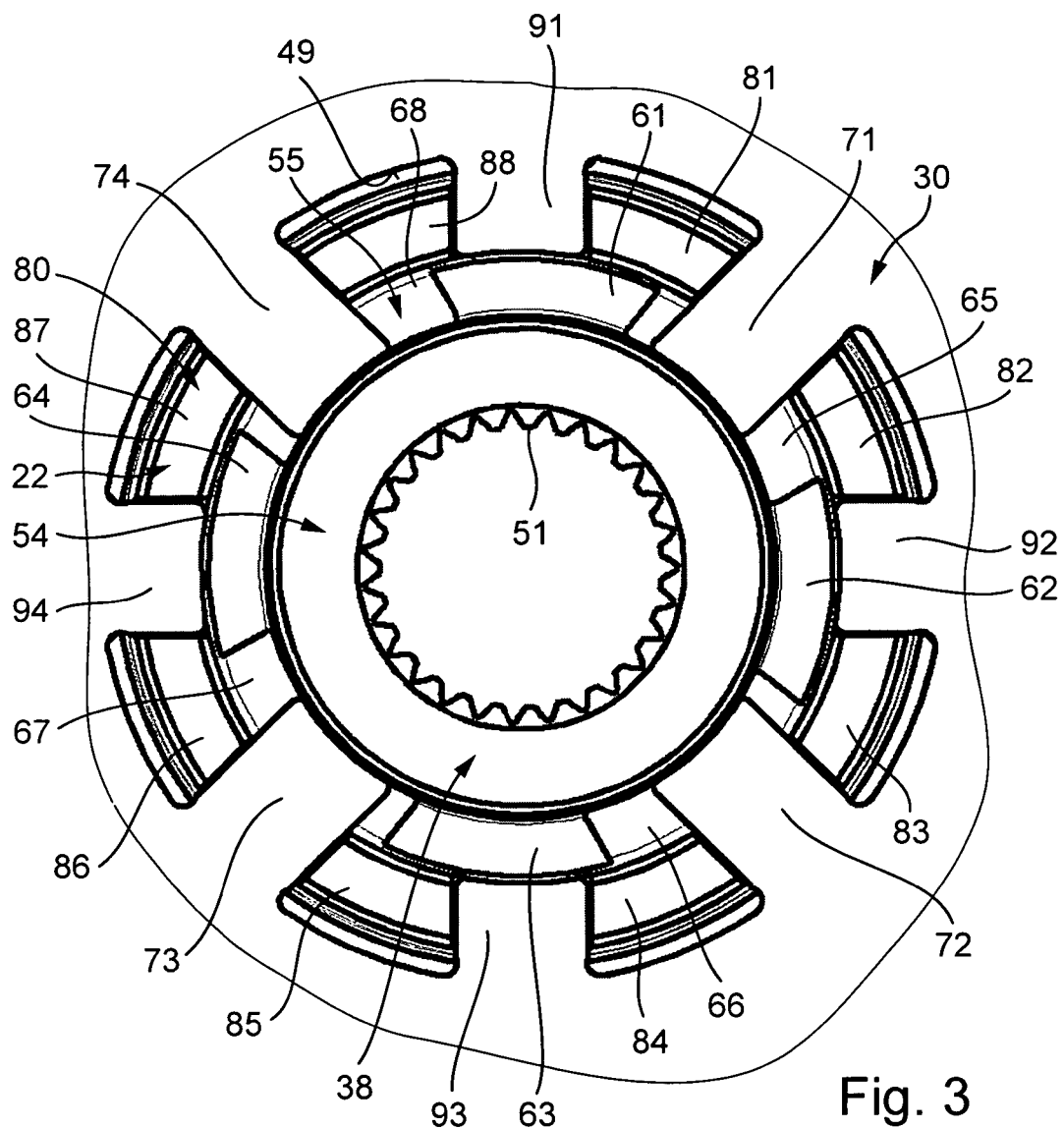

FIG. 3 shows the central section of driving plate 30 on turbine wheel hub 22 from FIG. 2 with damper hub 38 shown on an enlarged scale. Four stop limiting elements 61 through 64 extend axially from ring surface 55 of damper hub 38. Four stop limiting elements 61 through 64 each have the shape of an arc of a circle and are uniformly distributed over the circumference of ring surface 55. Essentially arc-shaped interspaces 65, 66, 67, 68 are recessed between two stop limiting elements 61, 62; 62, 63; 63, 64; 64, 61. Stop fingers 71 through 74 protruding into each interspace 65 through 68 extend radially from central through-hole 49 of driving plate 30. Stop fingers 71 through 74 are attached to driving plate 30 in one piece and are distributed uniformly over the circumference of through-hole 49. Due to the distance in the circumferential direction between stop fingers 71 through 74 and respective stop limiting elements 61 through 64, the size of the relative angle of rotation between driving plate 30 and damper hub 38 is defined.

Turbine wheel hub 22 has ring surface 80 on the outside, disposed radially and concentrically with ring surfaces 54, 55 of damper hub 38, eight coupling elements 81 through 88 extending axially away from the ring surface. Coupling elements 81 through 88 each are in the shape of arcs and are uniformly distributed over the circumference of ring surface 80. Stop fingers 71 through 74 pass between each of coupling elements 81, 82, 83, 84, 85, 86, 87, 88. In addition, coupling fingers 91 through 94 are arranged between two coupling elements 88, 81, 82, 83, 84, 85, 86, 87 and extend radially away from driving plate 30. Coupling fingers 91 through 94 are arranged so that they are uniformly distributed over the circumference of central through-hole 49 of driving plate 30 in alternation with stop fingers 71 through 74. However, coupling fingers 91 through 94 are designed to be shorter than stop fingers 71 through 74. This achieves the result that coupling fingers 91 through 94 do not engage in damper hub 38 but instead are each in contact with one stop limiting element 61 through 64 on the outside, disposed radially. Coupling fingers 91 through 94 and stop fingers 71 through 74 also serve to center driving plate 30 on damper hub 38.

The mechanical stop may be used in two directions of rotation, as shown here. However, there is also the possibility of using the mechanical stop in only one direction of rotation. In this case, a load in the other direction of rotation is absorbed by another mechanical stop, e.g., inside the damper.

LIST OF REFERENCE NUMERALS 1 drive train
3 drive unit
5 transmission
6 torque converter
10 housing
12 axis of rotation
14 housing wall
15 housing wall
16 connecting sheet metal part
17 starter gear rim
20 pump wheel
21 turbine wheel
22 turbine wheel hub
23 input shaft
24 stator
26 converter bridge coupling
27 rotational vibration damper
28 piston
29 friction plate
30 driving plate
33 energy storage element
35 damper flange
36 welded connection
38 damper hub
41 gear tooth area
42 gear tooth area
44 window
45 window
47 through-hole
48 through-hole
39 through-hole 51 internal gear teeth
53 damper hub body
54 ring surface
55 ring surface
61 stop limiting element
62 stop limiting element
63 stop limiting element
64 stop limiting element
65 interspace
66 interspace
67 interspace
68 interspace
71 stop finger
72 stop finger
73 stop finger
74 stop finger
80 ring surface
81 coupling element
82 coupling element
83 coupling element
84 coupling element
85 coupling element
86 coupling element
86 coupling element
88 coupling element
91 coupling finger
92 coupling finger
93 coupling finger
94 coupling finger

What is claimed is:

1. A mechanical stop mechanism for a torque converter (6), comprising a hub (22) for a turbine wheel (21);

a damper hub (38) connected to a rotational vibration damper (27), rotational vibration damper (27) connected to a converter bridge coupling (26); and, a damper including a plurality of springs, a flange rotationally fixed to the damper hub, and a driving plate (30), wherein the driving plate (30) is for receiving a torque load, wherein the torque load is transferable from the driving plate (30) to the flange via the springs, wherein the driving plate (30) is connected to converter bridge coupling (26), wherein as soon as a maximum design load of rotational vibration damper (27) has been exceeded, relative rotation of hub (22), damper hub (38), and driving plate (30) causes drive plate (30) to directly engage hub (22) and to directly engage damper hub (38) to create a first torque path between driving plate (30) and hub (22) and a second torque path between driving plate (30) and damper hub (38).

2. The mechanical stop mechanism recited in claim 1, further comprising a stop device, wherein the stop device has stop fingers (71-74) which emanate from driving plate (30), each protruding into an intermediate space (65-68) which is limited in the circumferential direction by two stop limiting elements (61-64) provided on the damper hub (38).

3. The mechanical stop mechanism recited in claim 2, wherein the stop fingers (71-74) extend radially inward from the central opening (49) in the driving plate (30).

4. The mechanical stop mechanism recited in claim 2, wherein the stop limiting elements (61-64) extend axially from the damper hub (38).

5. The mechanical stop mechanism recited in claim 2, wherein multiple stop fingers (71-74) are distributed uniformly over the circumference of the driving plate (30).

6. The mechanical stop mechanism recited in claim 2, wherein the stop fingers (71-74) are arranged between two coupling elements (81-88) in the circumferential direction, each extending outward from the hub (22).

7. The mechanical stop mechanism recited in claim 6, wherein the coupling elements (81-88) extend axially away from the hub (22).

8. The mechanical stop mechanism recited in claim 2, wherein a coupling finger (91-94) extends radially inward from the driving plate (30) between two stop fingers (71-74).

9. The mechanical stop mechanism recited in claim 8, wherein the coupling fingers (91-94) are arranged between two coupling elements (81-88) in the circumferential direction, with the coupling elements extending outward from the hub (22).

10. The mechanical stop mechanism recited in claim 1, wherein a damper hub flange (35) is mounted on the damper hub (38).

11. The mechanical stop mechanism recited in claim 10, wherein the damper hub flange (35) is integrally bonded to the damper hub (38).

* * * * *